July 21, 1931. J. N. SMITH 1,815,080
ELECTRODE FOR APPARATUS FOR ELECTROLYSIS OF WATER
Filed Aug. 21, 1928 2 Sheets-Sheet 1
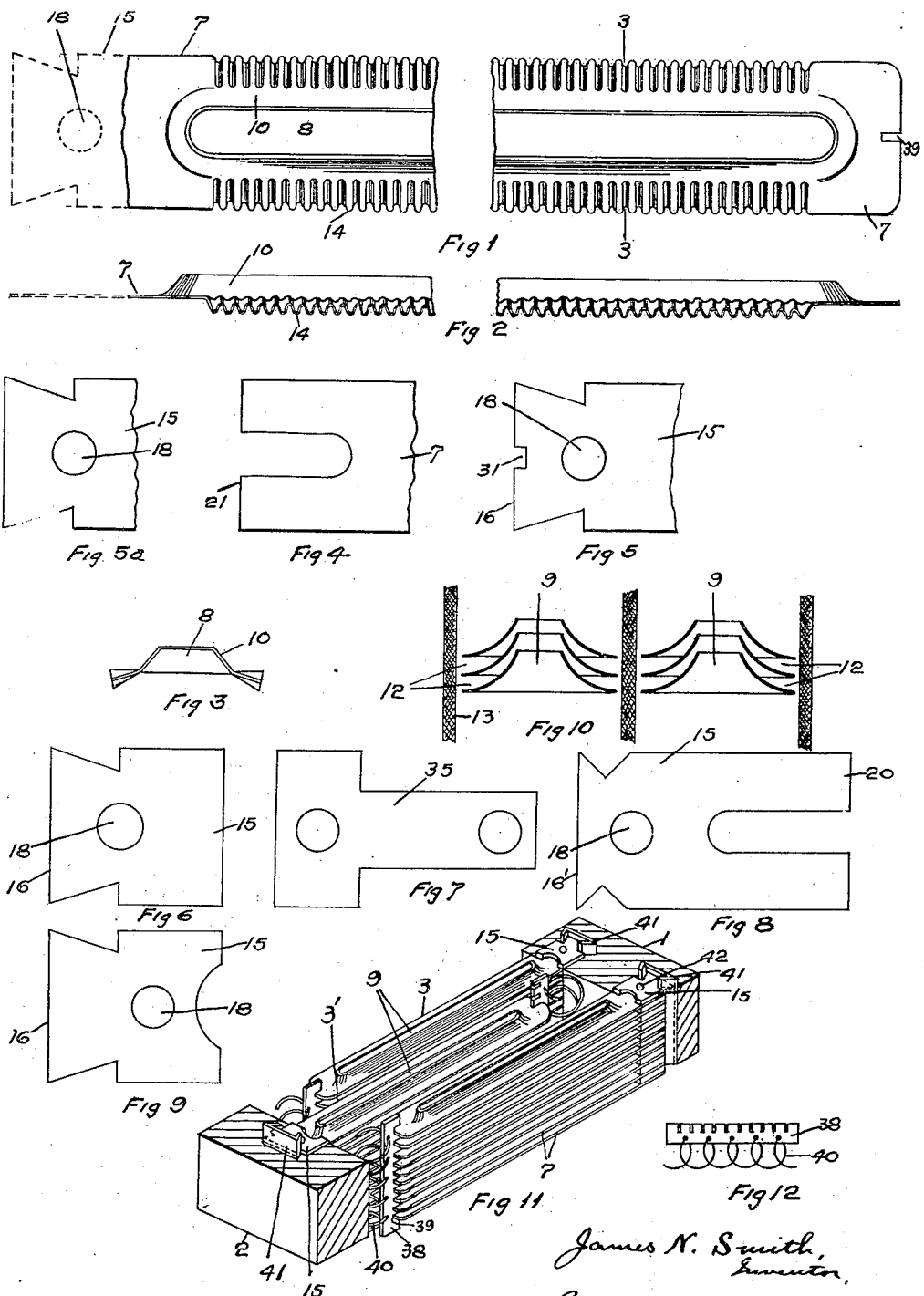

July 21, 1931.  J. N. SMITH  1,815,080
ELECTRODE FOR APPARATUS FOR ELECTROLYSIS OF WATER
Filed Aug. 21, 1928  2 Sheets-Sheet 2
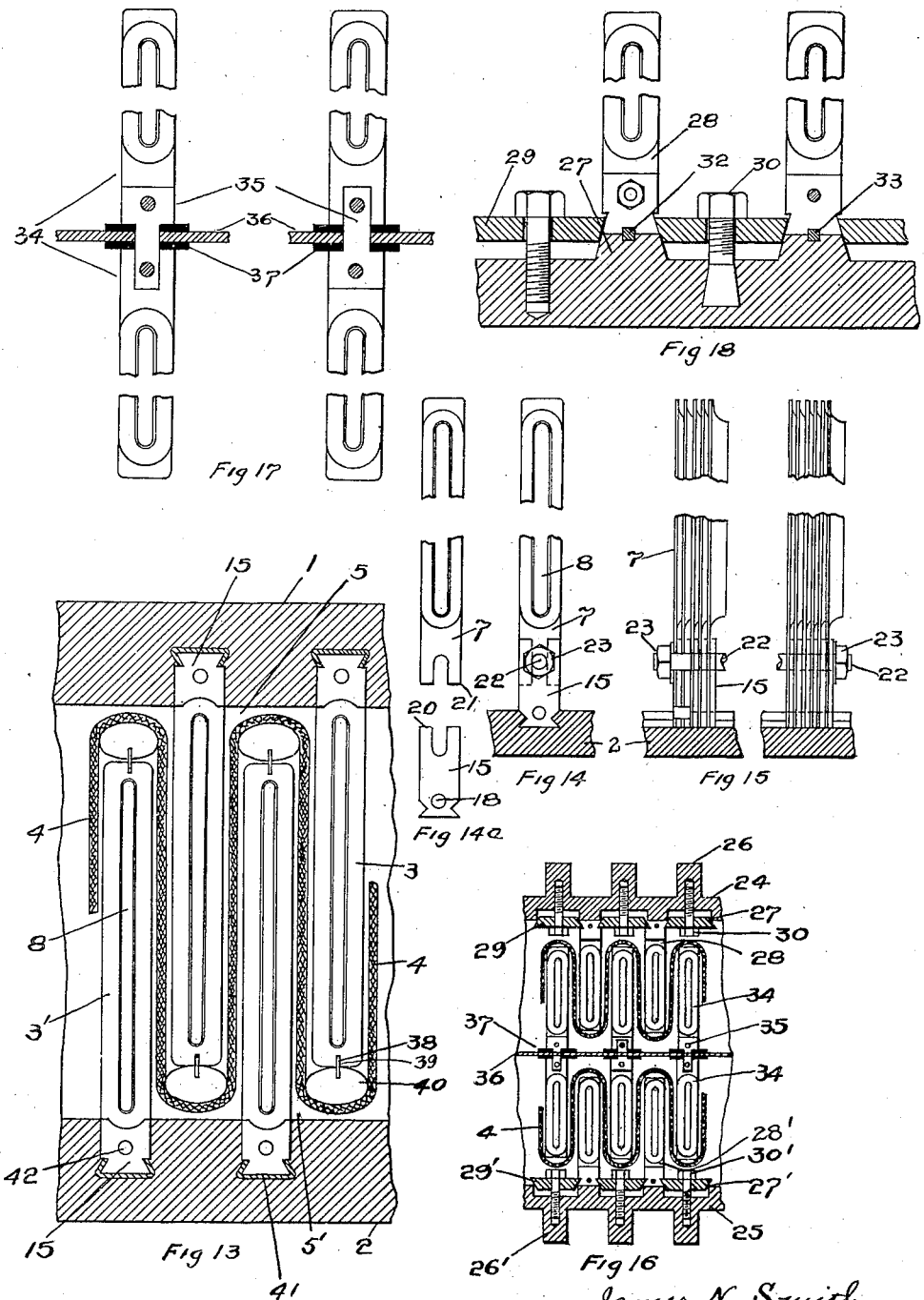

Patented July 21, 1931

1,815,080

UNITED STATES PATENT OFFICE

JAMES NORMAN SMITH, OF TORONTO, ONTARIO, CANADA, ASSIGNOR, BY MESNE ASSIGNMENTS, TO WESTINGHOUSE ELECTRIC & MANUFACTURING COMPANY, A CORPORATION OF PENNSYLVANIA

ELECTRODE FOR APPARATUS FOR ELECTROLYSIS OF WATER

Application filed August 21, 1928. Serial No. 301,142.

This invention relates to electrolytic cells, and more particularly to cells employed in the electrolysis of water.

The invention is particularly adapted to cells composed of interleaved electrodes separated by a sinusoidal diaphragm to divide the cell into two chambers.

The object of this invention is to provide a highly efficient and easily assembled cell from which the electrodes may be readily removed as required, and comprises, broadly, an electrode structure providing paths for directing or conducting the evolved gases away from the electrolyzing zone and into a non-electrolyzing discharge zone lying between the inner edges of electrode members of like polarity.

Preferably, the electrodes are made up of perforated metal strips which are so formed and spaced as to provide the paths just mentioned and also to provide an increased electrolyzing area at the most active portion thereof. The strips are alined and superposed so that the perforations coincide to form the discharge zone or channel above mentioned.

A feature, such as a resilient spacing member may be provided as an auxiliary support for the electrode and to space the diaphragm from the end thereof and also to keep the diaphragm under tension.

Various means may be provided for attaching or securing the electrodes to the cell walls; also other features, which will be apparent from the description of the illustrative embodiment of the same shown in the accompanying drawings, wherein:

Fig. 1 is a plan view of a metallic strip comprising one electrode element;

Fig. 2 is an edge view thereof;

Fig. 3 is a cross-section on the line 3—3 of Fig. 1;

Figs. 4, 5 and 5a are detail plans of several forms of the attaching end of electrode elements;

Figs. 6 to 9 inclusive, are detail views of various forms of spacing lugs;

Fig. 10 is a diagrammatic representation of a cross-section through a cell illustrating particularly the nested arrangement of the metallic strips composing the electrode;

Fig. 11 is an isometric view of part of a cell assembly;

Fig. 12 is a detail view of an auxiliary electrode support and resilient spacing member;

Fig. 13 is a horizontal section through a portion of a single cell;

Fig. 14 is a plan view of Fig. 15 showing an electrode element attached to a spacing lug;

Fig. 14a shows the same separated, with end plate removed;

Fig. 15 is a side view of Fig. 14, illustrating the assembly of the electrode elements and lugs;

Fig. 16 is a horizontal section through a portion of a two-cell unit, and

Figs. 17 and 18 are details thereof.

As shown in Figs. 11 and 13, the electrolytic cell, to which this invention may be advantageously applied, comprises end-plates 1 and 2 of opposite polarity, to which electrode elements 3 and 3' are attached, respectively, and project into the cell in interleaving arrangement.

Interposed between adjacent edges of the electrodes is a continuous diaphragm 4 (Fig. 13) which takes a sinusoidal course and separates the cell into two chambers 5, 5'. In this case, the electrode members and their separators are assembled on the dove-tail shaped assembling strip 41, being held tightly together by clamping bolts 42, and then cast into end plates 1 and 2.

The diaphragm 4 is omitted from Fig. 11 in order to show the arrangement of the electrode elements and associated parts.

The electrodes are made up of nested or alined, superposed electrode elements 3 and 3', as shown in Fig. 11. A preferred form and construction of these electrode elements is shown in Figs. 1 and 2, and comprises a metallic strip 7, perforated at 8 to provide an elongated central opening, so as to form, in their assembled relation (Figs. 10 and 11) a discharge channel 9 for the evolved gas. The portion 10 of the strip 7 around the perforation or opening 8 is bent or curved upwardly from the plane of the strip.

The curved or bent portions 10 of the assembled electrode elements provide upwardly inclined paths or passageways 12 (Fig. 10) for conducting the evolved gas from the electrolyzing zone 13 to the discharge channel 9.

As shown in Figs. 1 and 2, the outer or active portions of the metallic strips 7, are corrugated, as shown at 14, the depth of the corrugations decreasing from the active edges toward the central portion of the electrode elements. These corrugations increase the active or effective area of the electrode surface, and in addition, forming a series of separate paths to direct or conduct the evolved gases away from the electrolyzing zone.

It will be thus observed that the superposition of the strips form inwardly and upwardly inclined passageways from the active zone to the discharge channel, which facilitate the removal of the gas both from the said zone and from the cell proper (Fig. 10).

The corrugated edges also increase the mechanical strength or rigidity of the electrode elements, the elements being drawn out to a thinner cross-section increasing its active area, and I believe that the most important or effective and active portions of the electrode members are those adjacent the outer edges, and that the part of the passageway 12 which is most effective is the inwardly extending portion formed by those portions adjacent the outer edges of the electrode elements.

The metallic strips 7 may be attached to the lugs 15 in any of a number of ways, as illustrated in Fig. 14, for example.

The lugs may be of any suitable form, but are preferably provided with a dove-tail end portion 16, 16', as shown in Figs. 6, 8 and 9, which are cast into the end plates 1 and 2.

The electrode strips are individually removable from the electrode assembly, the lugs 15 and strips 7 being provided with U-shaped attaching ends, 20 and 21, respectively, (Figs. 8 and 4), which lugs also act as spacers for the electrode strips.

The strips 7 are then placed between two adjacent lugs 16 so that said ends overlap (Figs. 14–15), leaving an opening through which a rod 22, threaded at either end, may be passed to keep the elements alined and held securely together by nuts 23. By sufficiently loosening the nuts 23, any strip may be readily removed.

Instead of the electrodes and their spacers being cast into the end plates, as previously described, the electrodes may be connected to the end plates in the manner shown in Figs. 16 and 18.

Fig. 16 shows a two-cell unit or bi-polar cell, provided with end-plates 24 and 25 having projecting external fins or flanges 26 and 26' which are used for intercell connection and internal abutments 27 and 27'. In this instance the electrodes 28, 28', are held in place against the abutments by beveled strips 29, 29', which fit into the grooves of the dove-tail ends of the lugs and the electrodes are held firmly against said abutments by screws 30, 30', which pass though said strips 29 and 29', respectively, and thread into the end plates.

The abutting ends of the electrodes and lugs may be provided with corresponding keyways 31 (Fig. 5) and 32 respectively, into which may be passed a key 33 (Fig. 18).

Where the metal strips are to be assembled into a so-called double electrode 34 for use in bipolar cells, a T-shaped lug 35 (Figs. 7, 16 and 17), is used to connect electrode elements or sets of metal strips to form the double electrode. The T-shaped lugs are alternated end for end throughout the length of the assembled electrode member. The strip sections of the electrodes are mounted upon a middle plate 36 of the bipolar cell, and may be provided with suitable gaskets 37 which prevent leakage of electrolyte and gas from one cell into the other.

In order to afford additional support for the free ends of the electrodes 3, 3' (Figs. 11 and 13) not attached to the end plates or walls there is provided a notched bar 38 engaging into the notches 3 at the ends of the strips 7. In addition to acting as a support and alining member, the bar 38 serves as a spacer for the strips.

Threaded through the said bar is a helical spring 40 (Figs. 11 and 12) around which the diaphragm 4 (Fig. 13) is looped tightly so that the spring 40 exerts a constant pressure thereon and maintains the diaphragm in a central position between the active edges of the electrodes. This pressure is transmitted at the same time to the bar 38 and to the electrode elements 3, 3', to further aid in keeping the latter firmly in place.

It is to be understood that many changes could be made in the above construction and many apparently widely different embodiments of my invention may be used without departing from the scope of the appended claims, for which reason I intend that all matter contained in the above description or shown in the accompanying drawings shall be interpreted as illustrative merely of an operative embodiment of my invention and not in a limiting sense.

Having described my invention, what I claim is:

1. In an electrolytic cell, cooperating anode and cathode electrodes alternately positioned and supported by attachment at their ends to the respective end-plates of the cell, a diaphragm extending between the electrodes of opposite polarity, each of said electrodes being made up of nested perforated metal strips.

2. In an electrolytic cell, co-operating anode and cathode electrodes alternately positioned and supported by attachment at their ends to the respective end-plates of the cell, a diaphragm extending between the electrodes of opposite polarity, each of said electrodes being made up of alined, superposed, perforated metal strips to form a discharge channel intermediate the active edges of the electrode.

3. An electrode having a discharge zone intermediate its active edges comprising alined, superposed, perforated metal strips having corrugated active edges, the corrugations of adjacent strips forming a series of separate paths to direct the evolved gases away from the active edges of the electrode to said discharge zone.

4. An electrode element comprising a metal strip having a centrally located opening therethrough and its active outer edges corrugated.

5. An electrode element comprising a perforated metal strip having its active edge portions corrugated, said corrugations decreasing in depth from the active edges toward the central portion of the electrode element.

6. An electrode element comprising a perforated metal strip, the portion bounding said perforation being inclined, said strip being formed and adapted to be supported at one end with its opposite end free.

7. An electrode element comprising a perforated metallic strip having the portion of the strip bounding said perforation bent at an angle from the plane of said strip and having its outer edge portions corrugated, the corrugations decreasing in depth from the outer edge of the strip toward said perforation.

8. An electrode comprising alined, superposed, spaced apart and individually removable perforated metallic strips, and spacer lugs adapted to be permanently attached to the end plates of a cell and to which said strips are individually attached.

9. An electrode comprising alined, superposed and spaced apart metallic strips and spacer lugs, alternately positioned, said spacer lugs being cast into the end plates of a cell and supporting said strips, forming therewith a conducting area as a unit.

10. An electrode comprising alined, superposed, spaced apart and individually removable perforated metallic strips of which the active edges are corrugated.

11. An electrode comprising alined, superposed, spaced apart and individually removable perforated metallic strips of which the active edge portions are provided with corrugations decreasing in depth inwardly, and means for keeping said strips in their alined relation.

12. The combination with an electrolytic cell having interleaved electrodes separated by a sinusoidal diaphragm dividing the cell into two chambers, of a resilient spacing element disposed between the diaphragm and the outer or free ends of the electrode.

13. An element for use in electrolytic cells comprising an electrode engaging member and a resilient member adapted to produce tension on a diaphragm.

14. An element for use in electrolytic cells comprising a notched electrode engaging member and a helical spring carried by said member.

15. An electrode element comprising a perforated metallic strip, the transverse outline of which is substantially the frustrum of a cone, said strip being formed and adapted to be supported at one end from the end plate of a cell with its opposite end free.

16. A bi-polar electrode comprising two oppositely extending groups of electrode strips secured to an intermediate group of spacer lugs alternately positioned between said electrode strips, said spacer lugs being adapted to be mounted on and to extend through a separating plate of a bi-polar cell.

Signed at Toronto, Province of Ontario, Canada, this 16 day of August, A. D. 1928.

JAMES NORMAN SMITH.